United States Patent [19]
Fergusson

[11] Patent Number: 5,885,034
[45] Date of Patent: Mar. 23, 1999

[54] WASHER FOR USE IN MINING

[75] Inventor: Jeffrey Robert Fergusson, Glenorie, Australia

[73] Assignee: Industrial Rollformers Pty. Ltd., Smithfield, Australia

[21] Appl. No.: 750,409

[22] PCT Filed: Jun. 9, 1995

[86] PCT No.: PCT/AU95/00341

§ 371 Date: Mar. 20, 1997

§ 102(e) Date: Mar. 20, 1997

[87] PCT Pub. No.: WO95/33917

PCT Pub. Date: Dec. 14, 1995

[30] Foreign Application Priority Data

Jun. 9, 1994 [AU] Australia ................... PM6170

[51] Int. Cl.$^6$ .................. F16B 43/00; F21D 21/00
[52] U.S. Cl. ................ 405/302.1; 411/10; 411/537
[58] Field of Search .............. 405/259.1–259.6, 405/288, 302.1, 302.2, 303; 411/10, 11, 9, 531, 537, 546

[56] References Cited

U.S. PATENT DOCUMENTS

| | | | |
|---|---|---|---|
| 2,850,937 | 9/1958 | Ralston | 411/11 |
| 3,133,468 | 5/1964 | Cumming | 405/302.1 |
| 4,431,353 | 2/1984 | Capuano | 411/11 |
| 4,708,559 | 11/1987 | Locotos | 405/302.1 |
| 4,889,457 | 12/1989 | Hageman | 411/10 |
| 5,556,234 | 9/1996 | Oldsen et al. | 405/259.1 |

FOREIGN PATENT DOCUMENTS

| | | |
|---|---|---|
| 24004/77A | 4/1976 | Australia . |
| 172 665 A1 | 2/1986 | European Pat. Off. . |
| 1217210 | 5/1960 | France . |
| 2053582A | 5/1971 | Germany . |
| 55-112540A | 8/1980 | Japan . |
| 947816 | 1/1964 | United Kingdom . |

OTHER PUBLICATIONS

International Search Report in PCT/AU 95/00341, filing date 9 Jun. 1995, 4 pages in length.

*Primary Examiner*—Tamara L. Graysay
*Assistant Examiner*—Frederick L. Lagman
*Attorney, Agent, or Firm*—Limbach & Limbach L.L.P.

[57] ABSTRACT

The washer is of frusto-conical shape as viewed externally and consists of a body (21) and a tapered flange (23) depending therefrom. When the lip (28) of the flange rests on a flat surface and the washer is subjected to a predetermined compressive load (26) the tapering of the flange leads to its deformation radially outward. This expansion acts as a visual indication that the predetermined load has been applied. The flattening of the flange which also accompanies its deformation increases the contact area of the washer with the underlying surface and thereby reduces contact stresses. When used in rockbolting, hole (22) receives a rock bolt and the void defined by the flange (23) can accommodate a raised portion of a load plate. The recess (30) receives a bearing assembly or a domed element (the latter compensates for misalignment of the bolt with the surface) so as to transmit tightening loads from the nut of the rock bolt to the washer, etc.

2 Claims, 5 Drawing Sheets

WASHER FOR USE IN MINING

The present invention relates to a washer for use in mining and particularly but not exclusively for use with a load plate utilised in supporting a mine roof.

A known arrangement for supporting a roof of a mine is illustrated in FIG. 1 of the accompanying drawings. The arrangement 1 comprises a bolt 2 embedded in rock 3 and a load plate 4 secured against the rock face 10 by means of a tensioning nut 5 which is threadably fitted onto the bolt 2. Intermediate the nut 5 and the plate 4 is a domed element 6 which is mounted on the bolt so that a flat side 7 of the element faces the nut and curved surface 8 faces the plate 4. The element 6 provides a form of ball joint between the bolt 2 and the plate 4 by virtue of its hemispherical shape, to permit the plate 4 to be securely fastened to the rock face 10 even when the bolt 2 is angled away from the normal to the rock face 10.

The load plate 4 itself is formed of a base portion 11 and an upraised portion 12 which extends away from the general plane of the plate 4 and defines an opening 13 in which the element 6 is received.

One known form of the support member 4 is manufactured of steel and has dimensions in the order of 100×100×8 mm, with opening 13 in the order of 35 mm in diameter and upraised portion 12 extending in the order of 10 mm from the base portion 11. It has been found that such a support member is sufficient for the purpose of supporting loads in the order of 10 tonne but that loads in excess of 15 tonne cause the plate 4 to fail as a result of the projecting portion 12 deforming to such a degree that the element 6 and nut 5 pull through the support member 4, which in turn could lead to collapse of the ceiling 3.

It is an object of the present invention to provide a washer to improve the load bearing characteristics of the plate when used, for example, in an arrangement such as the arrangement 1 described above, and/or to provide some indication of when the load on the plate has reached a predetermined level prior to failure.

In accordance with the present invention there is provided a washer comprising a body portion defining a central opening and a tapered flange portion depending therefrom, the flange portion being tapered by a degree sufficient for the flange portion to deform outwardly upon application of a substantially axial predetermined compressive load.

Preferably, the flange portion is adapted to engage a load plate about an opening formed in the plate for receipt of a rockbolt, the outward deformation of the flange portion serving to increase the contact area between the washer and the plate to lower the contact stress therebetween.

Preferably, the outward deformation of the flange portion provides a visual indicator that the predetermined compressive load has been applied.

Preferably, the flange portion is adapted to fit over an upraised portion of a load plate which defines an opening for receipt of a rock bolt, and is configured to minimize contact between the upraised portion and the washer prior to application of the compressive load whereby to allow for ease of movement of the washer to accommodate for misalignment of the bolt and whereby the flange portion deforming during application of the compressive load results in an increased area of the flange portion being forced into contact with the load plate.

Preferably, the body portion has a recess formed in an end remote from the flange portion, the recess being adapted to receive a bearing assembly.

Alternatively the recess is configured so as to provide a seat for receipt of a domed element used for compensating for misalignment between a rockbolt and a load plate.

Preferably, the body portion of the washer includes a generally cylindrical internal surface and the flange portion has an internal surface which diverges outwardly from the cylindrical internal surface of the body portion.

The invention is more fully described, by way of non-limiting example only, with reference to the accompanying drawings in which.

Figure 2:
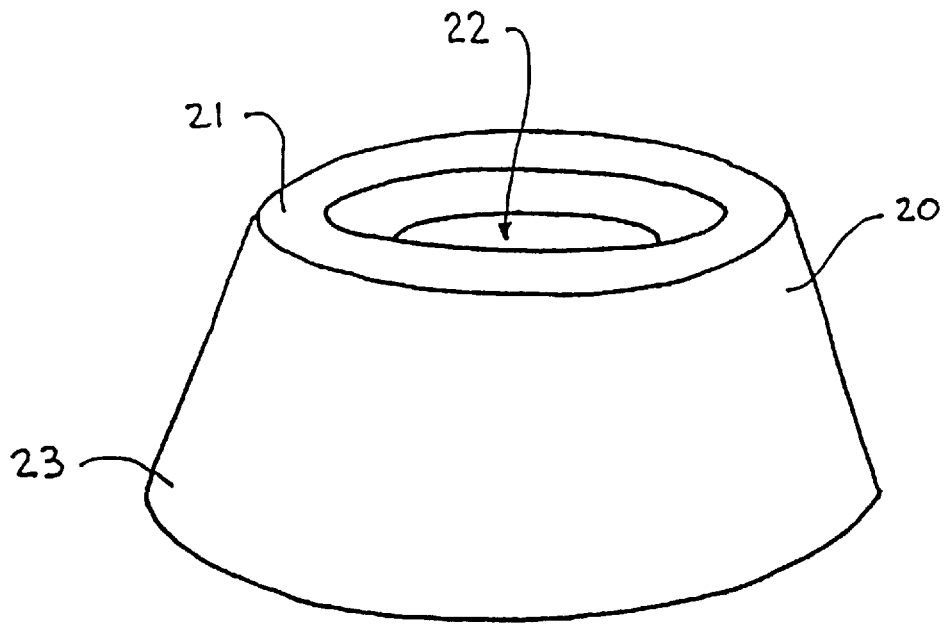
FIG. 2 is a perspective view of a washer in accordance with the present invention.
Figure 3:
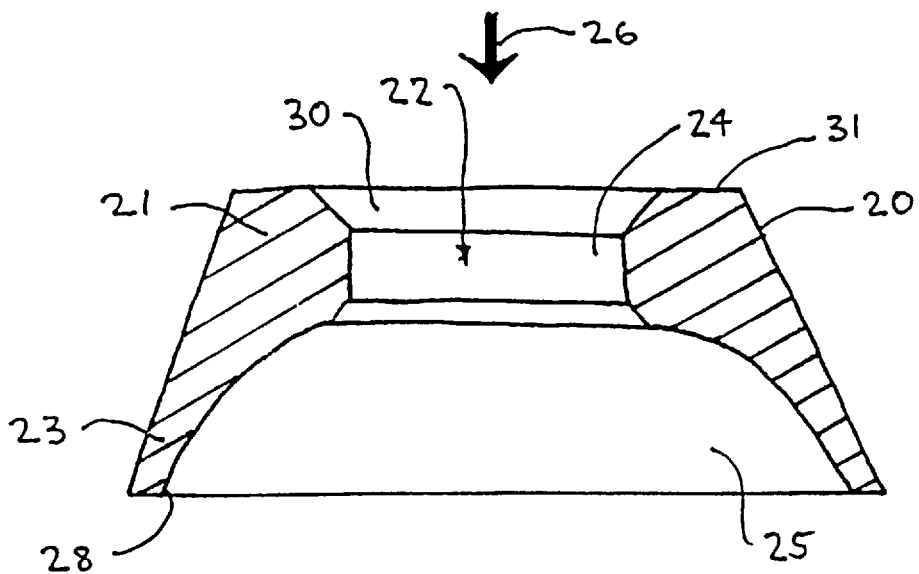
FIG. 3 is a cross-sectional view of the washer of FIG. 2.
Figure 4:
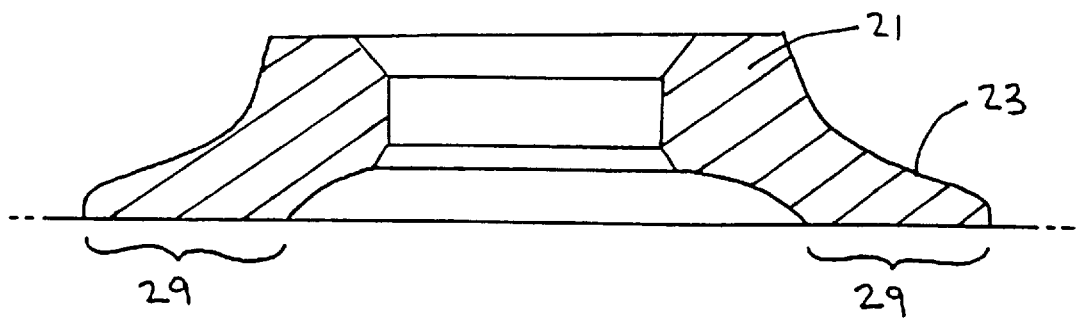
FIG. 4 is a cross-sectional view of the washer of FIG. 2, after application of a compressive load.

Referring firstly to FIGS. 2 and 3, a washer 20 is shown which comprises a body portion 21 defining a central opening 22, and tapered flange portion 23 depending therefrom. The external profile of the washer is frusto-conical and the internal surface is defined by a generally cylindrical portion 24 which extends into a concave outwardly divergent portion 25 forming the internal surface of the flange portion 23. The configuration of the flange portion 23 is such that application of a predetermined compressive load in an axial direction indicated by arrow 26, when the washer 20 is, for example, resting on flat surface 27, as shown in FIG. 4, results in the flange portion 23 deforming radially outwardly.

The washer is preferably formed of steel although any suitable material may be used. Both the internal and external profiles can be readily formed by conventional turning or lathe techniques, and the degree of taper applied to the flange portion can be varied so that the deformation occurs at any predetermined load.

Deformation of the flange portion 23 provides two advantagous effects. Firstly, the contact surface available for load transmission increases i.e load is initially transmitted between the washer 20 and the surface 27 via the lip 28 of the flange portion 23 and is subsequently transmitted via a greater area 29 which results from flattening of the flange portion 23. Secondly, the deformation itself provides visual indication of when a predetermined load is applied to the washer.

Figure 5:
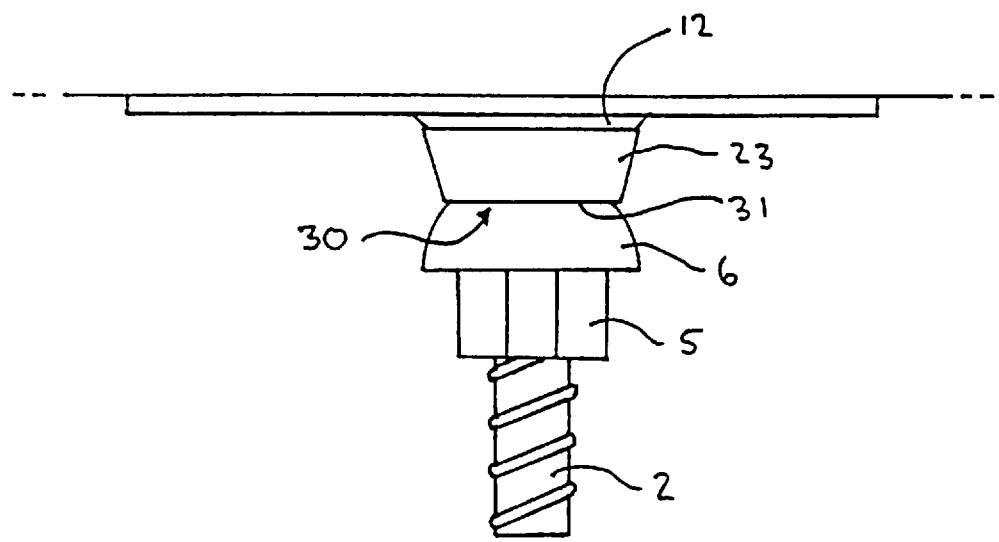
FIG. 5 is a side view of an arrangement similar to that shown in FIG. 1 including the washer of the present invention.
Figure 6:
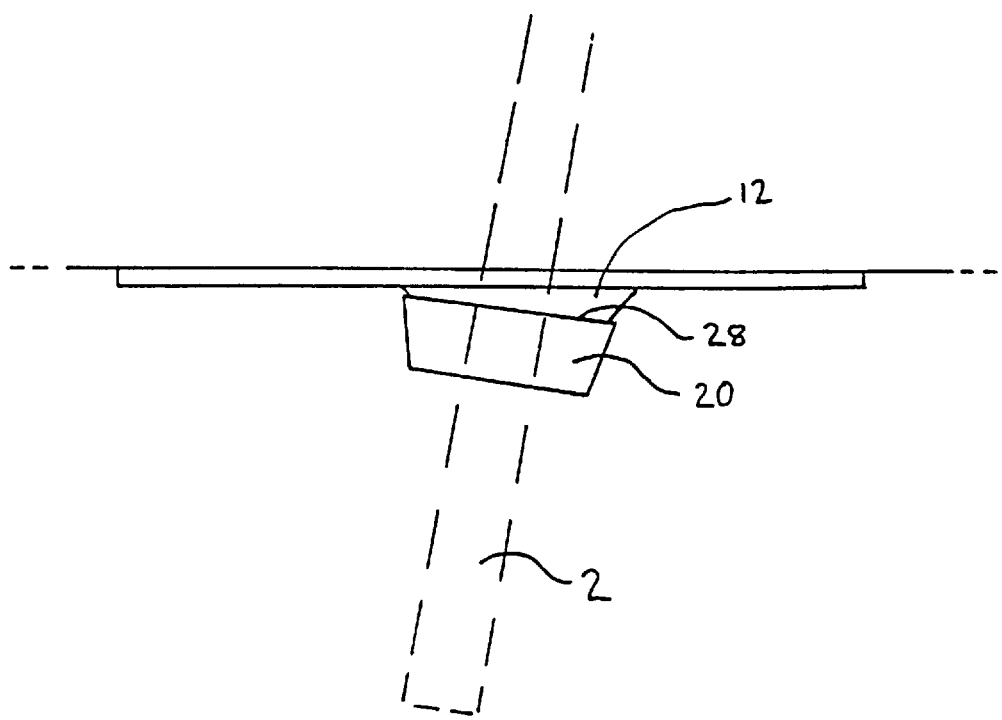
FIG. 6 is a side view of the washer of FIG. 2 used in conjunction with a load plate for compensating for misalignment of a rock bolt.

When used in the arrangement 1, as shown in FIG. 5, the flange portion 23 extends over the upraised portion 12. The shape of the internal surface of the flange portion 23 serves to minimise contact between the washer 12 and plate 4 and, in particular, the lip 28 only lies in contact with the upraised portion 12. As such, the washer can be readily swivelled to various orientations relative to the plate while still maintaining contact between the upraised portion and the washer, and can therefore be utilised to compensate for limited misalignment of the bolt relative to the opening, as represented in FIG. 6.

The body portion of the washer utilised in the arrangement of FIG. 5 includes a recess 30 in one end 31 thereof which is outwardly flanged to receive the domed element 6. However the recess may instead be of any configuration suitable, for example, to receive a bearing assembly or alternatively, may not be provided at all. In the absence of the recess, the domed element itself may be dispensed with.

As will be appreciated, the ability of the washer to accommodate for limited misalignment of the bolt 2 means that the domed element 6 need not necessarily be provided and the tensioning nut 5 may instead contact the end 31 of the washer directly.

Application of a predetermined compressive force deforms the flange portion 23 so that an increased area of the internal surface of the flange portion comes into contact with the upraised portion 12 of the plate 4. This serves to increase the contact area between the washer and plate so as to reduce contact stress therebetween by effectively spreading the compressive load over a greater area. This in turn enhances the load carrying capacity of the arrangement by reducing concentration of load which existed under similar load conditions between the domed element 6 and the opening 13 of the arrangement shown in FIG. 1.

Figure 1:
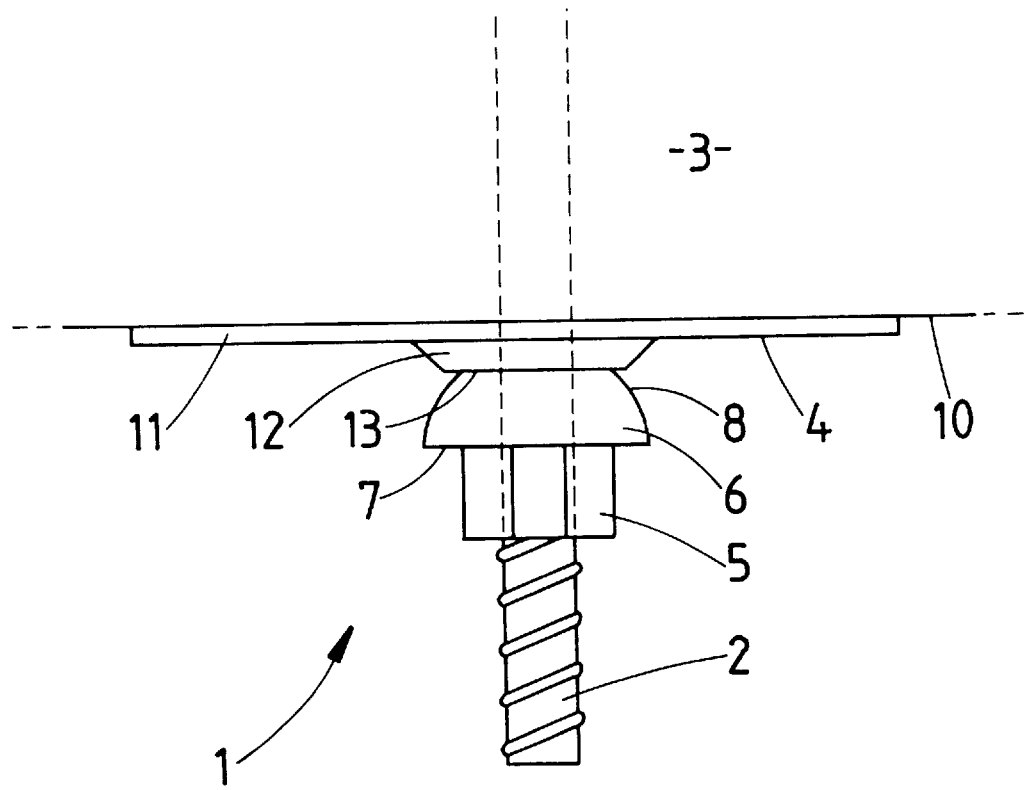
FIG. 1 is a side view of a known arrangement for supporting a load.

Tests have been conducted to determine the comparative load bearing capacity of the arrangements shown in FIGS. 1 and 5. Compressive loads of up to 50 tonne were applied and the arrangement utilising the washer of the present invention had still not failed up to this tonnage, whereas the arrangement without the washer failed at about 15 tonne.

As can be appreciated from the above, the washer of the present invention provides a number of significant advantages in that it deforms under load to provide an increased surface area for load transmission, thereby reducing contact stresses, it provides a visual indicator of when a predetermined load has been applied, it can compensate for some misalignment of a rock bolt relative to a load plate and is easy to manufacture.

As will be appreciated, many modifications and variations may be made to the washer and support member without departing from the spirit and scope of the invention as hereinbefore disclosed.

I claim:

1. A washer formed of metal, for use with a load plate utilized in supporting a mine roof, comprising a body portion defining a central opening and a tapered flange portion depending therefrom, the flange portion being tapered by a degree sufficient for the flange portion to deform outwardly upon application of a substantially axial predetermined compressive load, wherein the flange portion is adapted to fit over an upraised portion of the load plate which defines an opening for receipt of a rock bolt, and is configured to minimize contact between the upraised portion and the washer prior to application of the compressive load whereby to allow for ease of movement of the washer to accommodate for misalignment of the bolt and whereby the flange portion deforming during application of the compressive load results in an increased area of the flange portion being forced into contact with the load plate, such that the increased contact area between the washer and the plate serves to lower contact stresses therebetween and the outward deformation of the flange portion provides a visual indicator that the predetermined compressive load has been applied, wherein the body portion has a recess formed in an end remote from the flange portion, the recess being adapted to receive a bearing assembly.

2. A washer formed of metal, for use with a load plate utilized in supporting a mine roof, comprising a body portion defining a central opening and a tapered flange portion depending therefrom, the flange portion being tapered by a degree sufficient for the flange portion to deform outwardly upon application of a substantially axial predetermined compressive load, wherein the flange portion is adapted to fit over an upraised portion of the load plate which defines an opening for receipt of a rock bolt, and is configured to minimize contact between the upraised portion and the washer prior to application of the compressive load whereby to allow for ease of movement of the washer to accommodate for misalignment of the bolt and whereby the flange portion deforming during application of the compressive load results in an increased area of the flange portion being forced into contact with the load plate, such that the increased contact area between the washer and the plate serves to lower contact stresses therebetween and the outward deformation of the flange portion provides a visual indicator that the predetermined compressive load has been applied, wherein the body portion has a recess formed in an end remote from the flange portion, the recess being configured so as to provide a seat for receipt of a domed element used for compensating for misalignment between a rockbolt and a load plate.

* * * * *